Sept. 8, 1959 H. TOOMIM ET AL 2,903,523

BIDIRECTIONAL ZERO ADJUSTMENT CIRCUIT

Original Filed March 24, 1952 2 Sheets-Sheet 1

INVENTORS.
HERSHEL TOOMIM
GEORGE HENRY HARE
BY THEIR ATTORNEYS.
HARRIS, KIECH, FOSTER & HARRIS
BY [signature]

Sept. 8, 1959 H. TOOMIM ET AL 2,903,523

BIDIRECTIONAL ZERO ADJUSTMENT CIRCUIT

Original Filed March 24, 1952 2 Sheets-Sheet 2

INVENTORS.
HERSHEL TOOMIM
GEORGE HENRY HARE
BY THEIR ATTORNEYS.
HARRIS, KIECH, FOSTER & HARRIS
BY [signature]

United States Patent Office 2,903,523 Patented Sept. 8, 1959

2,903,523

BIDIRECTIONAL ZERO ADJUSTMENT CIRCUIT

Hershel Toomim, North Hollywood, and George Henry Hare, Pasadena, Calif., assignors to Beckman Instruments, Inc., So. Pasadena, Calif., a corporation of California Original application March 24, 1952, Serial No. 278,176, now Patent No. 2,744,222, dated May 1, 1956. Divided and this application January 17, 1956, Serial No. 564,344

5 Claims. (Cl. 179—171)

This invention relates to electrometer-amplifiers employing a dynamic capacitor and used in the measurement of small magnitude signals, particularly D.C. or slowly varying voltage signals, wherein extremely high input impedance is required. The circuit arrangement of the invention is, in addition, generally applicable to any class of amplifiers wherein a direct current input signal is modulated to produce an alternating current, which current is applied to an A.C. amplifier, particularly if the resulting frequency of modulation is a multiple of the modulator-exciting frequency as in the instances hereinafter cited. This application is a division of our copending application entitled Dynamic Capacitor, Serial No. 278,176, filed March 24, 1952, now Patent No. 2,744,222. While the invention is directed to an improved dynamic capacitor and to a circuit arrangement for amplifying the output thereof, as disclosed hereinafter, the invention presented herein is specifically directed to a wide range bi-directional zero adjustment which may be used in conjunction with electrometer-amplifiers.

The new dynamic capacitor and the circuit arrangement in which it is incorporated are both also applicable with outstanding advantages to the detection, amplification and measurement of current signals, by simple adaptation of the arrangement herein disclosed. Moreover, the same combination of dynamic capacitor and circuit arrangement provides a particularly valuable and improved design for a regulated D.C. power supply. For the purpose of the present disclosure, however, and to illustrate the principles involved, the invention is described herein primarily as applied to voltage signals. The specific circuit arrangement is an electrometer designed to measure hydrogen-ion concentration or pH, particularly with a glass electrode.

In a typical dynamic capacitor electrometer, the D.C. signal is applied to the capacitor-modulator, the plates of which vary in spacing cyclically and thereby convert the signal into alternating current. The alternating current, which varies in magnitude with the magnitude of the signal, is applied to the input of an A.C. amplifier, the amplifier output being then usually converted to D.C. in a suitable manner to provide a measure of the input signal. Preferably, the circuit operates as a negative feedback amplifier, the amplifier output being demodulated by rectifying and filtering to generate a voltage which is returned to the input in series with and opposed to the input signal. In this way the amplified D.C. feedback signal can be made an accurate measure of input signal, the measurement being essentially independent of amplifier gain and other circuit variables.

In the present specific adaptation of the electrometer to the measurement of hydrogen-ion concentration, one object of the invention is to provide a means for adjusting the zero point of the instrument which compensates for spurious D.C. components introduced by the pH-sensitive electrode system, and, to a relatively small extent, by the dynamic capacitor. In the electrode system, the D.C. component referred to here is commonly termed "asymmetry potential," this being a characteristic of any given electrode assembly, which characteristic varies only slowly over long periods of time and is independent of the ion concentration of the sample solution. The component introduced by the dynamic capacitor arises from the contact potential difference of its surfaces.

In applications other than pH measurements, a similar need may exist for a zero adjustment of wide range compared to the inherent zero stability of the instrument itself, for the purpose of zero suppression and the like. The usual expedient is to provide a battery-powered potentiometer control as a means of furnishing a zero-adjusting potential either positive or negative with respect to the ground reference potential of the instrument.

In the present embodiment of the invention, however, no recourse to use of batteries is made, and a means is provided whereby a regulated source of single polarity only may furnish an adjustment of either polarity. Moreover, a simple means of regulation is provided for this purpose which does not require that the D.C. plate supply as a whole be regulated.

Although the apparatus and method of this invention have been described with particular reference to measurement of voltage signals, it is apparent that the invention is likewise applicable to measurement of current signals. This adaptation merely requires that a resistor of known value be connected across the input terminals, which resistor conducts the current to be measured, and exhibits a proportional voltage drop across its terminals. This voltage drop is measured in the manner herein disclosed.

The above and other objects and advantages of the invention will be apparent in the following detailed description taken with the accompanying drawings.

In the drawings, which are to be regarded as merely illustrative:

Figure 1:
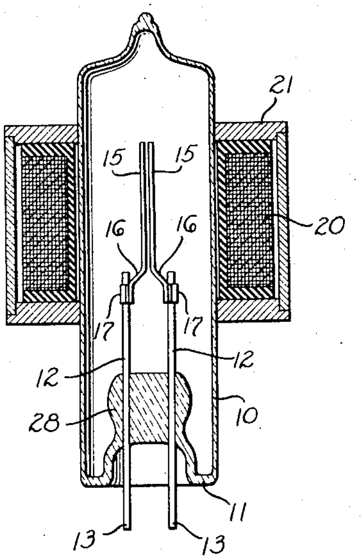
Fig. 1 is a view of the presently preferred embodiment of the dynamic capacitor, partly in side elevation and partly in section.

The presently preferred embodiment of the new dynamic capacitor shown in Fig. 1 has a tubular envelope 10 of nonmagnetic material, in this instance glass, with a re-entrant bottom wall 11. A pair of conductors 12 extending through and sealed in the bottom wall 11 are of substantial diameter and rigidity so that the lower external ends 13 of the conductors may serve as base prongs whereby the device may be plugged into a circuit in the same manner as a conventional vacuum tube.

Figure 3:
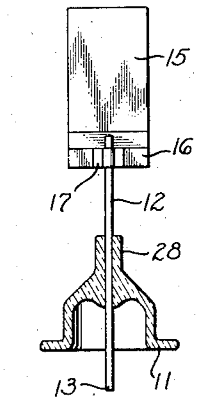
Fig. 3 is a similar view showing how the conductors that support the plates of the dynamic capacitor are mounted in the end wall.

The plates 15 of the dynamic capacitor comprise a pair of sheet metal members mounted face-to-face, each plate having an offset base portion 16. These base portions are turned away from each other to provide relatively large spacing therebetween and to permit the plates to be mounted on and supported by the two separated conductors 12. As shown in Figs. 1 and 3, each plate 15 may be suitably bonded to the corresponding conductor 12, for example, by welding, with an added reinforcing strip 17 across the joint.

The sheet material of the capacitor plates 15 is preferably a ferromagnetic metal. The flat body portions of the plates 15 may be approximately 5/8" wide, 1" long and .02" thick. Spaced approximately .004" apart, these provide a static capacitance of approximately 35 micromicrofarads.

In the construction shown, the external means for actuating the plate 15 comprises aan electromagnetic coil 20 in a suitable casing 21 surrounding the tubular envelope 10 in the region which encloses the two plates 15. When the electromagnetic coil 20 is energized by alternating current it produces an alternating magnetic field so oriented with respect to the two plates 15 as to cause the two plates to be magnetized with neighboring ends of like polarity. Since the mutual repulsive force actuating the reeds is independent of the polarity of the magnetic field, the two plates 15 are periodically mutually repelled at twice the frequency of the current and the natural frequency of the structure inside the envelope 10 is sufficiently close to this double frequency to permit the two plates 15 to vibrate efficiently at the same double rate.

Figure 4:
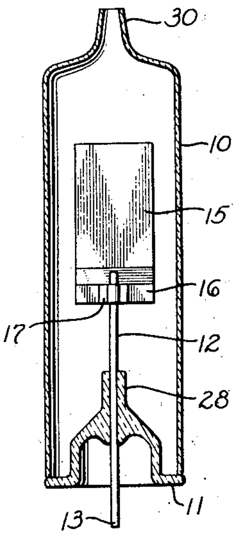
Fig. 4 is a sectional view of the completed glass envelope ready for the evacuation of air and moisture.
Figure 2:
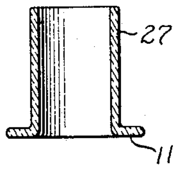
Fig. 2 is a sectional view of a "flare" or glass end wall for the envelope of the dynamic capacitor.

The presently preferred procedure for fabricating the dynamic capacitor is illustrated by Figs. 2–4.

When the two blanks for a dynamic capacitor have been cut and bent to form the offsets 16 the two plates are carefully sandblasted. After the sandblasting, the plates are handled with exceeding care to avoid contamination and preferably the two plates to be paired to form a dynamic capacitor are immediatley positioned face-to-face for mutual protection during subsequent fabrication steps.

In the next step, the two conductors 12 for holding the two plates 15 are maintained in the desired spaced positions and then sealed in an end wall member 11. The end wall member 11 has the initial separate form shown in Fig. 2, being a flared member with a tubular wall 27. The tubular wall 27 is heated to a suitably plastic state and then is simply pinched to form a solid glass body 28 as indicated in Fig. 3 embedding and sealing the two conductors 12. The glass and the conductors, of course, have approximately the same coefficient of thermal expansion. The pair of sandblasted plates are then supported in a suitable jig and welded to the conductors 12.

After the capacitor assembly is mounted in the wall member 11 as shown in Fig. 3 the two capacitor plates 15 are carefully adjusted to the desired uniform spacing and then the shell of the glass envelope 10 is positioned as shown in Fig. 4 and the shell is fused to the wall member 11 to complete the envelope.

At this stage in the fabrication procedure, a nozzle 30 is drawn at upper end of the envelope to provide a convenient point for evacuating the structure. Preferably, the envelope is exhausted to a pressure of $10^{-4}$ mm. Hg; and a flame is applied to the envelope to remove residual moisture and gases. The envelope may be sealed in evacuated state, but it is preferable to fill the envelope with a suitable gas for the sake of the damping effect of the gas on the vibrating plates 15. Heretofore, inert gases have been employed for this purpose. However, it has been found that random signal disturbances observed in the instrument could be attributed to the effect of ionizing radiation occurring in the environment and operating on the relatively large ionization cross section of the inert gas. This effect is greatly reduced when, according to the present invention, hydrogen gas, presenting a small ionization cross section, is employed. The hydrogen gas so employed furthermore provides the necessary damping and a reducing atmosphere toward which the vibrating plates are chemically stable, wherefore changes in contact potential are minimized. The use of hydrogen thus makes it possible to use inexpensive base metals for the plates. The pressure of the hydrogen may, for example, be 1 atmosphere.

A conductive film is finally applied to the exterior of the envelope, but this is not allowed to extend over the base portion thereof, where high insulation between the leads must be maintained. This coat may be graphitic or metallic, and is applied in any desired conventional manner, to provide effective shielding against electrostatic interference from charges on the envelope or signal in the exciting coil. Preferably the coating is grounded by suitable contact means.

Figure 5:
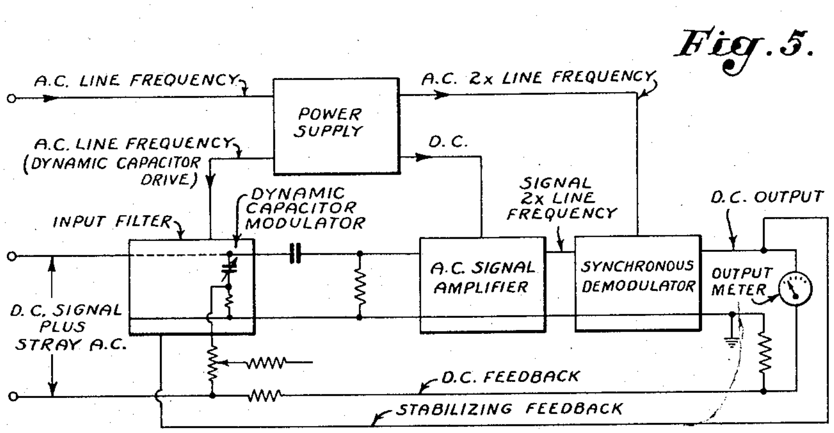
Fig. 5 is a block diagram of the preferred embodiment of the electrometer.
Figure 6:
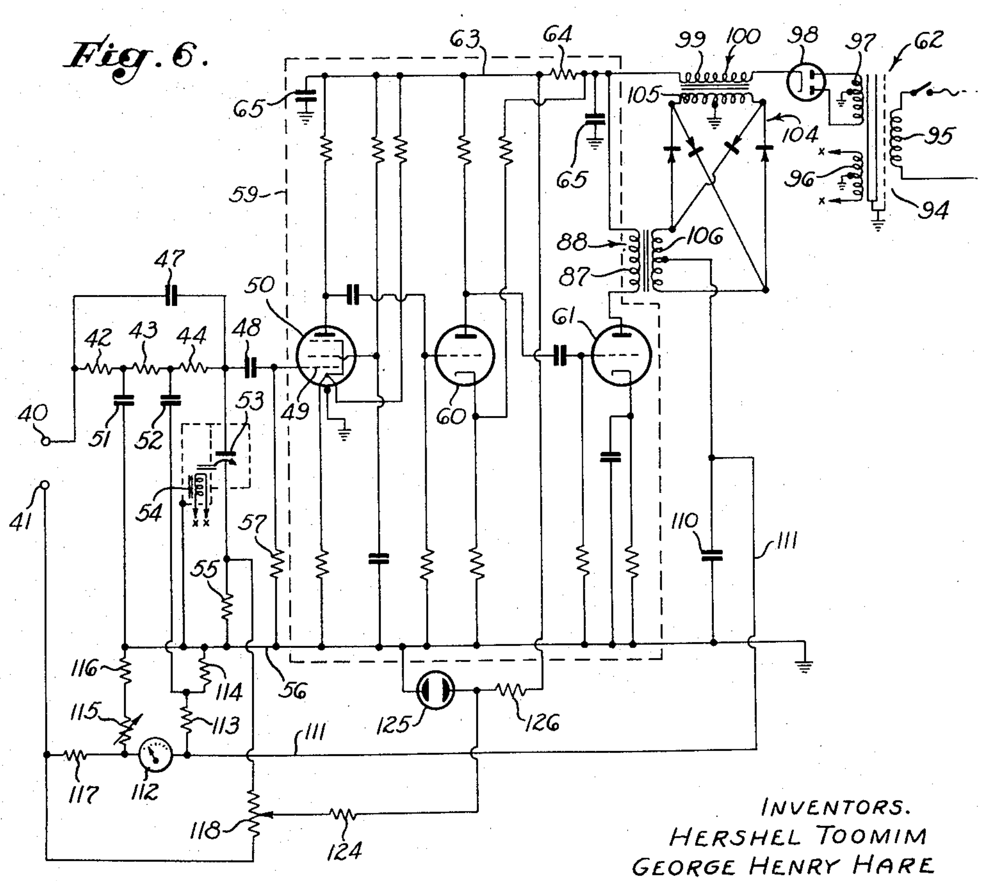
Fig. 6 is a wiring diagram of the electrometer.

The manner in which the invention may be embodied in an electrometer to serve specifically as a pH meter may be understood by reference to Figs. 5 and 6.

Fig. 5 is a block diagram showing the general operating principles of the measuring instrument. It will be noted that line frequency A.C. current from the power supply is applied to the energization of the dynamic capacitor-modulator and that the modulator is included in the input filter. The resulting double line frequency A.C. output of the dynamic capacitor-modulator is applied to the input of the A.C. amplifier, the amplifier being energized by direct current from the power supply. The output of the A.C. amplifier is applied to the synchronous demodulator which, as shown, receives a double line frequency reference signal from the power supply, the reference signal being inherently synchronous with the A.C. signal produced by the dynamic capacitor-modulator. The D.C. output from the synchronous demodulator passes through a calibrated resistor to the circuit "ground," i.e., the point of zero reference potential for the input signal, the current being measured on a suitable meter, and the voltage generated across the resistor is fed back to the input terminals in series opposition to the input signal. The total input signal applied to the dynamic capacitor is thereby substantially degenerated to zero while the amplified current measured by the indicating meter is accurately proportional to the input signal to be measured.

Fig. 6 shows the components of a pH meter constructed in accord with the block diagram of Fig. 5.

The electrometer shown in Fig. 6 has an input terminal 40 for connection with the usual pH-responsive glass electrode and a second input terminal 41 for connection with the cooperating reference electrode.

The input terminal 40 is connected directly to a multiple section input filter of infinite attenuation type adjusted preferentially to attenuate stray input signal of line frequency, and in this instance comprises three resistance-capacitance sections. The three resistors 42, 43 and 44 of the three filter sections connected in series, are shunted by a capacitor 47 and are coupled by a capacitor 48 with the input grid 49 of the first tube 50 in the A.C. signal amplifier. Parallel capacitors 51 and 52 complete the first two sections of the input filter and the previously described dynamic capacitor-modulator, indicated at 53, comprises what may be regarded as the last section of the input filter. The plates of the dynamic capacitor-modulator 53 are energized in the manner heretofore described by an electromagnetic coil 54. The dynamic capacitor-modulator 53 is returned to ground through a suitable resistor 55 connected to a common ground lead 56 and the input grid 49 is connected to the ground lead through a resistor 57.

The amplifier for the A.C. signal generated by the dynamic capacitor-modulator 53 is indicated by the dotted outline 59. This amplifier comprising three resistance-coupled vacuum tubes 50, 60 and 61 is of conventional construction. The plate circuits of the amplifier are connected to a suitable D.C. power supply generally designated 62 by way of a line 63 that includes a resistor 64 and is coupled to ground through two filter capacitors 65.

The power supply 62 includes a transformer 94 having a primary 95 for connection to the A.C. power line. The transformer has one secondary 96 for energizing the electromagnetic coil 54 of the dynamic capacitor-modulator 53 and has another secondary 97 which is part of a center-tapped, full-wave rectifier that includes a vacuum tube 98. The output of the vacuum tube 98 is fed to the D.C. power line 63 through the primary coil 99 of a transformer 100, the primary coil serving as a choke for the power supply.

The amplified A.C. output of the three-tube amplifier is demodulated by a synchronous double-balanced demodulator generally designad 104 which in this embodiment is of the "ring" type and includes both secondary coil 105 of the transformer 100 and the secondary coil 106 of the transformer 88. The center of the secondary coil 105 is made the ground return point for the demodulator circuit as shown.

The output current of the demodulator at the center tap of the secondary coil 106 is filtered by capacitor 110, which is returned to ground, and is conducted by feedback line 111 through the indicating milliammeter 112, variable resistor 115 and the fixed output resistor 116 to the circuit ground. Resistor 116 is a calibrating resistor which determines the voltage or pH range of the meter 112. Variable resistor 115 is a compensating element, manually adjustable, or forming the sensitive element of a resistance thermometer, which adjusts instrument response to correct for the temperature dependent output voltage of the indicating electrode.

The voltage, referred to ground, which is induced at the point of common connection of the meter 112 and the variable resistor by passage of the feedback current through resistor elements 115 and 116, is applied to input terminal 41 by way of resistor 117.

Resistor 126, gas discharge tube 125 (preferably a neon voltage regulator tube) and resistor 124 comprises a regulator for supplying current at substantially constant voltage. Signal from this source is adjustably apportioned by potentiometer 118 for application to resistors 55 and 117. Resistors 113 and 114 comprise a tapped voltage divider between feedback line 111 and the circuit ground for limiting the high frequency signal feedback in shunt across the input. This frequency signal is taken from the point of common connection between resistors 113 and 114 and applied to capacitor 52 of the input filter as shown.

The operation of the electrometer may be understood from the foregoing description. The D.C. signal to be measured together with any superimposed stray A.C. components is applied to the input filter which serves to reduce the amplitude of the stray A.C. components sufficiently to keep such components from affecting the operation of the A.C. amplifier. The resistor 44 in the last filter section may be considered as the isolating resistor for the dynamic capacitor-modulator 53. The capacitor 48 isolates the dynamic capacitor-modulator from grid current effects in the first stage of the amplifier.

The D.C. signal to be measured first appears across the dynamic capacitor-modulator which, as previously explained, generates a corresponding double-line frequency A.C. signal proportional in magnitude to the applied D.C. signal.

The A.C. output of the amplifier, of double the line frequency, is converted to D.C. in the synchronous rectifier 104 which is supplied with a reference voltage of double the line frequency by the winding 105 coupled to the choke winding 99 of the power supply. The resulting D.C. output has residual A.C. components which are removed in part by an output filter comprising the capacitor 110 in combination with internal impedance of the demodulator.

The filtered output D.C., measured by a meter 112, traverses the series resistor elements 115 and 116 to ground. The voltage generated across this resistor combination is fed back to be applied to the capacitor-modulator effectively in series with the input voltage to be measured. If the amplifier is of sufficiently high gain, and if, as provided by the circuit design, the feedback D.C. voltage is always of such polarity as to oppose the input signal, then the feedback current will be such as to generate a voltage across resistor elements 115 and 116 always closely equal in magnitude to the input voltage. The current measured by meter 112 will be accurately proportional to the D.C. input voltage signal, the full scale voltage range being the product of full scale meter current and the combined resistance of elements 115 and 116. The variable resistor 115 may be a manual control, calibrated in degrees of temperature, or may be the resistance element of a thermometer immersed in the sample to be measured, along with the measuring electrodes. By this means the pH-indicating scale is expanded or contracted to compensate for change or response of the sensing electrode as a function of its temperature.

It will be observed that a change of polarity in the voltage to be measured, applied to the dynamic capacitor, results in a 180° change of phase in the induced and subsequently amplified A.C. signal. The demodulator, however, being synchronous with the capacitor-modulator and phase sensitive, correspondingly reverses the polarity of its output signal, thereby providing a feedback voltage always of polarity to oppose the measured voltage, regardless of polarity of the latter.

Adjustment of the amplifier zero, i.e., indicator scale position corresponding to zero volts input, in order to accommodate contact potential differences in the capacitor-modulator and the variable asymmetry potential of electrode systems, is obtained as follows:

The gas discharge tube 125, preferably a neon voltage regulator tube, in series with resistor 126 across the D.C. plate supply, provides a simple source of regulated voltage. Current from this source is divided by potentiometer 118 in a variable ratio between resistors 117 and 55. The currents applied through these resistors produce voltages having respectively opposite effects in shifting the zero point. Current through resistor 55 injects a voltage between the low impedance side of the capacitor-modulator and a point of zero reference potential for the input signal (herein indicated as the circuit ground) and shifts the zero negatively. Current through 117 injects a voltage, of the same polarity with respect to the zero reference point, in series with the feedback voltage, and shifts the zero positively. Accordingly, adjustable resistor 118 serves as a bi-directional zero control, although powdered from a source of positive polarity only. It may be noted that although resistors 117, 118 and 55 form a series path to ground which shunts the calibration resistances 115 and 116, the combined resistance of the three former elements is sufficiently high compared to resistors 115 and 116 to leave the calibration accuracy unaffected.

The three-section input filter positioned ahead of the amplifier rejects stray input signal of line frequency, while feedback of high frequency components stabilizes the amplifier against oscillation which the input filter would otherwise induce. In order that phase shift in the feedback high frequency components be kept within the permissible maximum, the high frequency feedback is applied to some point of the input filter other than the first filter section. In this instance, for example, the return is to the second filter section, but in some applications of the invention the return may be to the third filter section on the low-impedance side of the capacitor-modulator.

Our description in specific detail of the presently preferred embodiment of the invention will suggest to those skilled in the art various changes, substitutions, and other departures from our disclosure.

We claim as our invention:

1. In an amplifier for producing a D.C. output responsive to an input signal, and providing a wide range bi-directional zero adjustment compared to the instrument zero drift, the combination of: an input signal modulating means having two terminals, one terminal communicating with the input signal and the other terminal being at low impedance and communicating with a point of zero reference potential for the input signal, said modulating means converting said input signal into an alternating current signal; an A.C. amplifier; means for coupling said alternating current signal to said A.C. amplifier; a demodulator for converting the output of said A.C. amplifier to a D.C. output; means coupled to said D.C. output producing a feedback voltage; means for connecting said feedback voltage in opposition to said inuput signal; means for inserting a first voltage of fixed polarity between the low impedance terminal of the modulating means and said point of zero reference potential; means for inserting a second voltage of the same fixed polarity in series with the feedback voltage; and means for variably proportioning said first and second inserted voltages.

2. An amplifier as set forth in claim 1 in which said input signal modulating means is a dynamic capacitor and in which said means for inserting said first and second voltages comprises: a first resistor connected between the low impedance terminal of the capacitor-modulator and said point of zero reference potential; a second resistor connected in series with said means for producing a feedback voltage; a voltage source stable with respect to said point of zero reference potential; and circuit means coupling said voltage source to said first resistor and to said second resistor, said circuit means including potentiometer means for variably proportioning current from said voltage source to said first and second resistors.

3. An amplifier as set forth in claim 2 in which said voltage source is provided by a gas discharge voltage regulator tube connected in series with a resistor across the D.C. plate supply of said A.C. amplifier.

4. In a circuit having means for producing an output signal as a function of an input signal, including means for modulating the input signal, the means for modulating having first and second terminals, a wide range bidirectional zero adjustment for the output signal including: means for coupling said second terminal to a point of zero reference; means for producing a balance voltage which opposes the input signal; means for serially connecting said balance voltage and the input signal between said first terminal and said point of zero reference; means for inserting a first supplementary voltage of a fixed polarity between said second terminal and said point of zero reference; means for inserting a second supplementary voltage of the same fixed polarity in series with said balance voltage; and means for varying the ratio of said first and second supplementary voltages.

5. A zero adjustment as defined in claim 4 in which said means for inserting said first and second supplementary voltages comprises: a first resistor connected between said second terminal and said point of zero reference; a second resistor connected in series with said means for producing a balance voltage; a voltage source stable with respect to said point of zero reference; and circuit means coupling said voltage source to said first resistor and to said second resistor, said circuit means including potentiometer means for applying currents in a variable ratio from said voltage source to said first resistor and to said second resistor.

References Cited in the file of this patent

UNITED STATES PATENTS

| | | |
|---|---|---|
| 2,730,573 | Sedgfield et al. | May 1, 1956 |
| 2,744,168 | Gilbert | May 1, 1956 |

UNITED STATES PATENT OFFICE

CERTIFICATE OF CORRECTION

Patent No. 2,903,523 September 8, 1959

Hershel Toomim et al.

It is hereby certified that error appears in the printed specification of the above numbered patent requiring correction and that the said Letters Patent should read as corrected below.

Column 3, line 7, for "aan" read -- an --; column 5, line 37, before "frequency" insert -- high --; column 6, line 44, for "powdered" read -- powered --; column 7, line 7, before "producing" insert -- for --.

Signed and sealed this 1st day of March 1960.

(SEAL)

Attest:

KARL H. AXLINE

Attesting Officer

ROBERT C. WATSON

Commissioner of Patents